United States Patent [19]

Itoh et al.

[11] Patent Number: 5,149,350

[45] Date of Patent: * Sep. 22, 1992

[54] APPARATUS FOR FUSION-SPLICING A PAIR OF POLARIZATION MAINTAINING OPTICAL FIBERS

[75] Inventors: Kenichiro Itoh; Takeshi Yamada; Tsutomu Onodera, all of Sakura; Mikio Yoshinuma, Yachiyo; Yasuyuki Kato, Mito, all of Japan

[73] Assignees: Fujikura Ltd.; Nippon Telegraph & Telephone Corporation, both of Tokyo, Japan

[*] Notice: The portion of the term of this patent subsequent to Jan. 22, 2008 has been disclaimed.

[21] Appl. No.: 633,764

[22] Filed: Dec. 26, 1990

Related U.S. Application Data

[63] Continuation of Ser. No. 379,690, Jul. 11, 1989, Pat. No. 4,986,843, which is a continuation of Ser. No. 51,741, May 18, 1987, abandoned.

[30] Foreign Application Priority Data

| May 20, 1986 | [JP] | Japan | 61-115901 |
|---|---|---|---|
| May 20, 1986 | [JP] | Japan | 61-115902 |
| May 20, 1986 | [JP] | Japan | 61-115903 |
| May 20, 1986 | [JP] | Japan | 61-115904 |

[51] Int. Cl.⁵ .......................................... C03B 25/00
[52] U.S. Cl. ........................................ 65/12; 65/29; 65/4.21; 65/152; 65/153; 65/158; 65/160; 156/502; 356/73.1; 356/153; 356/426
[58] Field of Search .................. 65/4.1, 4.2, 4.21, 11.1, 65/12, 29, 36, 57, 152, 158, 160; 264/1.5; 356/73.1, 153, 400, 426; 350/96.21; 156/502

[56] References Cited

U.S. PATENT DOCUMENTS

| 4,049,414 | 9/1977 | Smith | 65/152 |
|---|---|---|---|
| 4,245,885 | 1/1981 | Hodge | 350/96.20 |
| 4,248,499 | 2/1981 | Lierte et al. | 350/96.21 |
| 4,315,666 | 2/1982 | Hicks | 350/96.15 |
| 4,372,768 | 2/1983 | Zucker et al. | 65/4.21 |
| 4,375,768 | 3/1983 | Beck et al. | 73/861.23 |
| 4,548,630 | 10/1985 | Biedka | 65/2 |
| 4,603,941 | 8/1986 | Fujii et al. | 350/96.15 |
| 4,695,306 | 9/1987 | Hakoun et al. | 65/152 |
| 4,725,297 | 2/1988 | Grigsby et al. | 65/4.2 |
| 4,749,252 | 6/1988 | Yanagi et al. | 350/96.21 |
| 4,807,960 | 2/1989 | Oppenlander | 350/96.22 |
| 4,810,054 | 3/1989 | Shinbori et al. | 350/96.21 |
| 4,911,524 | 3/1990 | Itoh et al. | 350/96.21 |

FOREIGN PATENT DOCUMENTS

| 0091738 | 10/1983 | European Pat. Off. . |
|---|---|---|
| 186819 | 9/1986 | European Pat. Off. . |
| 3325157 | 1/1985 | Fed. Rep. of Germany . |
| 3329293 | 2/1985 | Fed. Rep. of Germany . |
| 53-29143 | 3/1978 | Japan . |
| 58-10722 | 2/1983 | Japan . |
| 60-232513 | 11/1985 | Japan . |

OTHER PUBLICATIONS

Patent Abstracts of Japan vol. 8, No. 163 (P-290) (1600) Jul. 27, 1984 & JP A 59060411 (Nippon Denshin Denwa Kosha), Jun. 4, 1984.
Patent Abstracts of Japan vol. 9, No. 30(P-333) (1753) Feb. 8, 1985, & JP A59174808 (Nippon Denshin Denwa Kosha) Mar. 10, 1984.

*Primary Examiner*—Kenneth M. Schor
*Assistant Examiner*—John J. Bruckner
*Attorney, Agent, or Firm*—Frishauf, Holtz, Goodman & Woodward

[57] ABSTRACT

An apparatus for fusion splicing optical fibers has one rotatable clamp mechanism that is manually operated and a second rotatable clamp mechanism that is operated by a motor. A three position stopper functions in the first position as a stopper against the optical fibers when the optical fibers are moved toward each other and in the second position as a mirror for reflecting an image of respective end faces of the optical fibers. A rapid fine adjustment of the alignment of the polarization maintaining optical fibers can be made.

3 Claims, 9 Drawing Sheets

APPARATUS FOR FUSION-SPLICING A PAIR OF POLARIZATION MAINTAINING OPTICAL FIBERS

This is a continuation of application Ser. No. 07/379,690 filed Jul. 11, 1989, now U.S. Pat. No. 4,986,843, which is a continuation of U.S. Ser. No. 051,741 filed May 18, 1987, now abandoned.

BACKGROUND OF THE INVENTION

This invention relates to an apparatus for fusion-splicing a pair of polarization maintaining optical fibers and, more particularly, to an improvement on a mechanism for aligning a pair of polarization maintaining optical fibers with each other when the optical fibers are fusion-spliced.

In aligning a pair of polarization maintaining optical fibers to be fusion-spliced with each other, the optical fibers must be moved not only in X and Y directions (those are oriented orthogonally on the cross sections of the optical fibers), but also in the circumferential direction.

Figure 1:
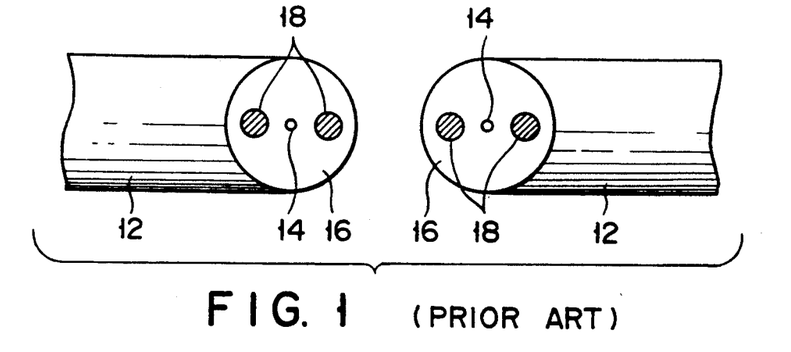
FIG. 1 shows in cross sectional form a pair of polarization maintaining optical fibers, in which the stress-applying parts of the fibers are aligned with each other.
Figure 2:
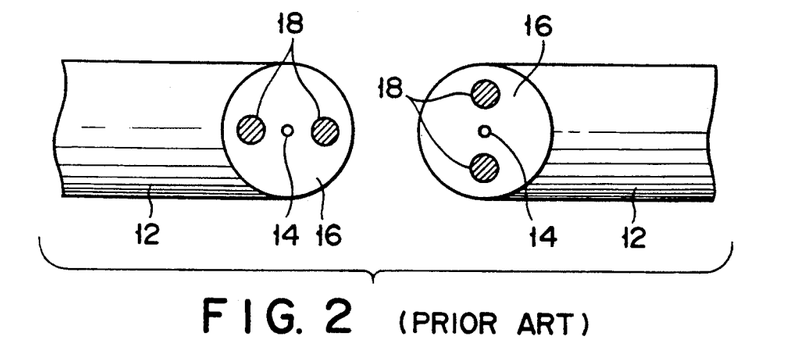
FIG. 2 shows in cross sectional form a pair of polarization maintaining optical fibers, in which the paired stress-applying parts of the fibers are displaced at the maximum angle (90 degrees) one from the other.
Figure 3:
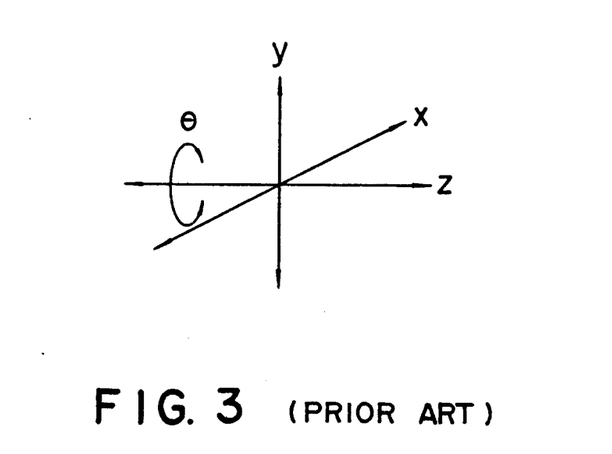
FIG. 3 shows a diagram showing the directions in which the optical fibers are moved for alignment of the fibers.

As shown in FIGS. 1 and 2, each of a pair of polarization maintaining optical fibers comprises cores 14, cladding region 16, and stress-applying parts 18. FIGS. 1 and 2 only show the portions of the optical fibers, which are adjacent to the to-be-fusion-spliced end faces of the fibers. These figures show the cross sections of the fibers, thereby to facilitate the understanding of the structure of the optical fibers, although actually they cannot be seen since the fibers are positioned face-to-face. The remaining portion of each fiber is covered with sheath laid around and in contact with cladding region 16. The exposed portion of each fiber where the sheath is peeled off will be referred to as an exposed fiber portion 12. The portion covered with sheath will be referred to as a sheathed fiber portion 11 (not shown in FIGS. 1 and 2). The entire optical fiber will be referred to as optical fiber 10.

In aligning a pair of polarization maintaining optical fibers with each other, in order to minimize the extinction ratio, stress-applying parts 18 of one of the fibers are, as shown in FIG. 1, aligned with those of the other fiber, or are, as shown in FIG. 2, displaced in maximum from those of the other fiber.

In both cases, the optical fibers must be moved in X and Y directions so as to obtain the axial alignment of the fibers. These directions are orthogonally oriented to each other on the cross sections of the fibers.

Further, the fibers are turned by angle θ in a circumferential direction around the axes of the fibers, i.e., the respective Z-axis to align the stress-applying parts 18 of the fibers or to displace the parts in maximum.

Practically, however, it is very difficult to turn the optical fibers finely in the circumferential direction so that the stress-applying parts may be aligned or displaced in maximum.

SUMMARY OF THE INVENTION

Accordingly, an object of this invention is to provide an apparatus for fusion-splicing a pair of polarization maintaining optical fibers, in which a mechanism for aligning the fibers is improved.

According to the invention, there is provided an apparatus for fusion-splicing a pair of polarization maintaining optical fibers, comprising:

rotating means including a first mechanical means for clamping one of a pair of polarization maintaining optical fibers, and for manually rotating said clamped optical fiber about its axis, a second mechanical means for clamping the other polarization maintaining optical fiber, and for rotating said clamped optical fiber about its axis by a motor, whereby said pair of the optical fibers are aligned with each other;

rotation control means for controlling the rotation of said motor so as to vary the extinction ratio of light emitted from the light emitting end of said pair of optical fibers; and means for fusion-splicing said pair of optical fibers by an arc discharge after said fibers are aligned with each other.

According to the invention, there is further provided an apparatus for fusion-splicing a pair of polarization maintaining optical fibers, comprising:

stopper means to which the end faces of a pair of polarization maintaining optical fibers abut, said stopper means being provided with mirror means for reflecting an image of the end faces of said pair of optical fibers when said mirror means is set at the place where said pair of optical fibers are made abut at the end faces;

a microscope for observing via said mirror means the alignment of said pair of optical fibers at the end faces;

means for setting said mirror means at the highest position higher than the end face abutting position, said end face abutting position, and the lowest position lower than said end face abutting position;

rotating means for clamping said pair of optical fibers, and rotating said pair of clamped optical fibers about their axes manually, whereby said pair of optical fibers are aligned with each other; and means for fusion-splicing said pair of aligned optical fibers by an arc discharge.

According to the invention, there is still further provided an apparatus for fusion-splicing a pair of polarization maintaining optical fibers comprising:

fiber clamps and sheath clamps for respectively clamping the exposed fiber portions and the covered fiber portions of a pair of polarization maintaining optical fibers, said fiber clamps and sheath clamps being interlocked in operation;

sheath clamp releasing means for releasing said sheath clamps from clamping of said covered fiber portions, while said exposed fiber portions is being clamped by said fiber clamps;

rotating means for clamping said pair of optical fibers and rotating said clamped optical fibers about their axes, whereby said pair of optical fibers are aligned with each other; and means for fusion-splicing said pair of aligned optical fibers by an arc discharge.

According to the invention, there is yet further provided an apparatus for fusion-splicing a pair of polarization maintaining optical fibers comprising:

rotating means for clamping a pair of polarization maintaining optical fibers and rotating said clamped optical fibers about their axes, whereby said pair of optical fibers are aligned with each other;

means for fusion-splicing said pair of aligned optical fibers by an arc discharge; and twist preventing means including an arm removably coupled with the fusion-splicing apparatus and clamp means for clamping said pair of optical fibers when said arm is coupled with the fusion-splicing apparatus, said clamp means extending from each end of said arm, whereby, when said pair of optical fibers coupled with twist preventing means are removed from the fusion-splicing apparatus, no twist is generated to said pair of optical fibers.

DETAILED DESCRIPTION OF THE PREFERRED EMBODIMENTS

Some specific embodiments of this invention will be described in detail referring to the accompanying drawings.

Figure 4:
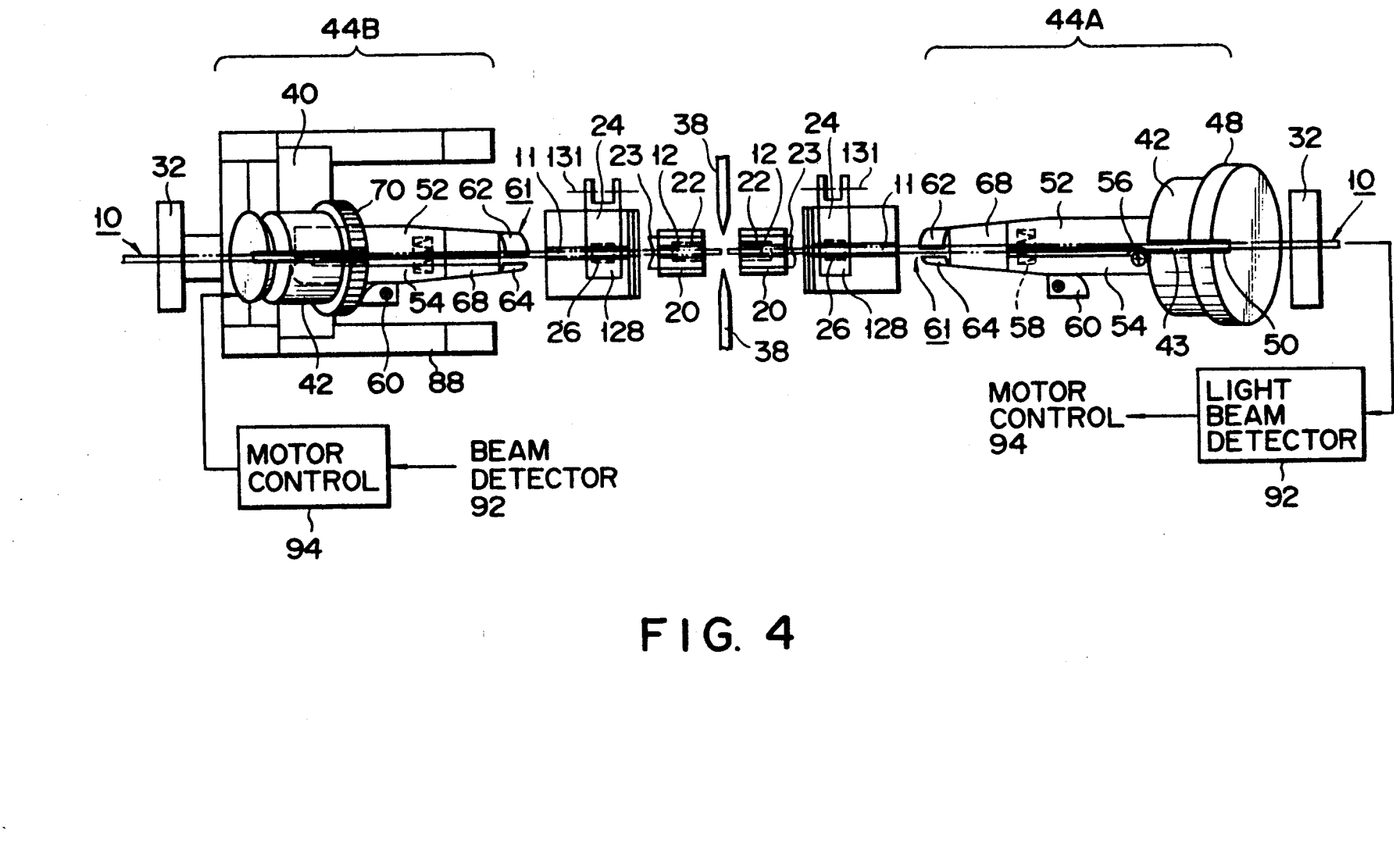
FIG. 4 shows a plan view of an apparatus for fusion-splicing optical fibers, according to an embodiment of the present invention.
Figure 5:
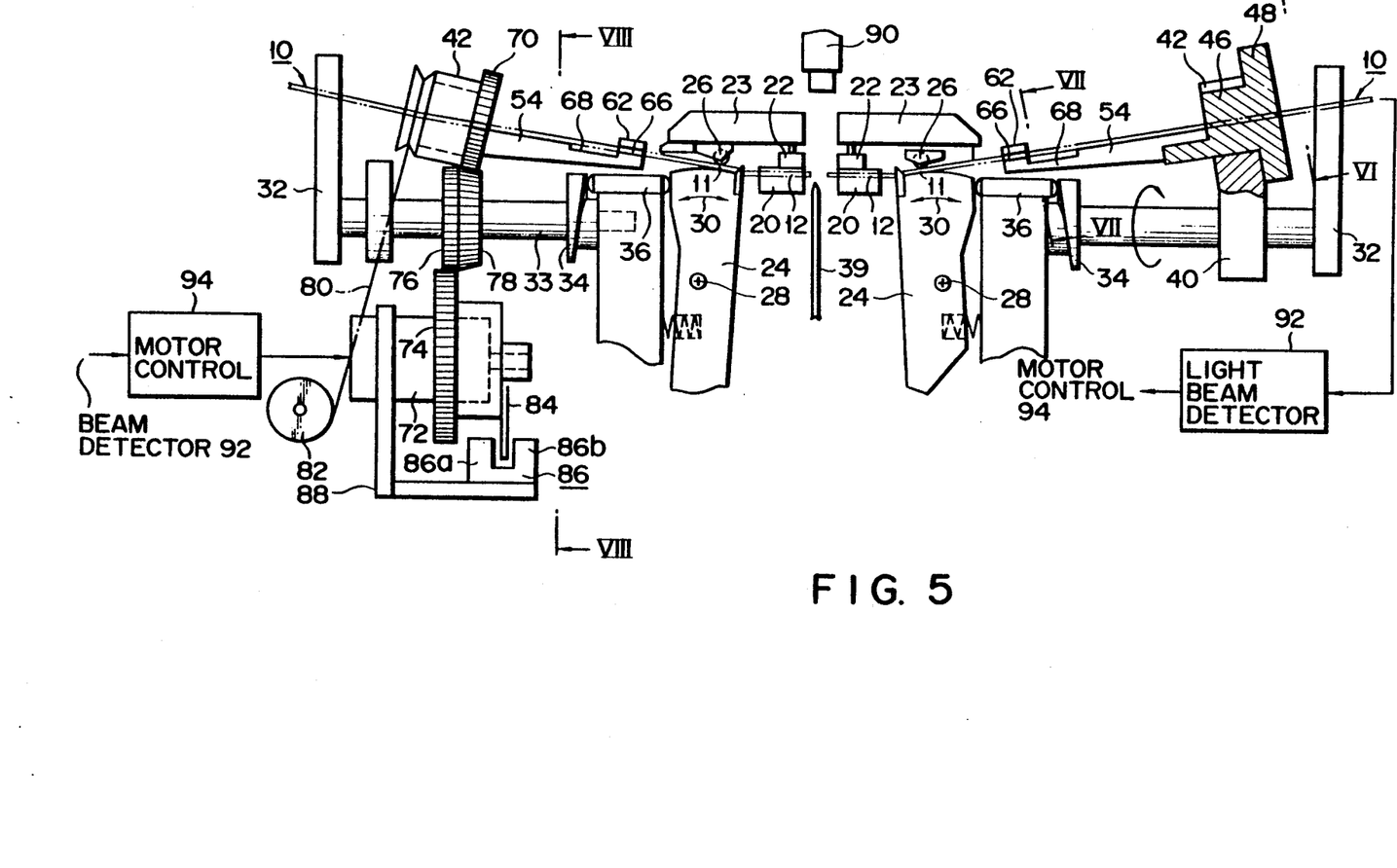
FIG. 5 shows a side view of the fusion-splicing apparatus of FIG. 4.

As shown in FIGS. 4 and 5, the exposed fiber portions 12 of a pair of polarization maintaining optical fibers 10 are placed in the V-grooves of a pair of V-groove blocks 20. The exposed fiber portions 12 placed in the V-grooves are respectively clamped by a pair of fiber clamps 22. Fiber clamp 22 is provided at one end of fiber clamp arm 23. A pair of sheathed or covered fiber portions 11 of optical fibers 10 are placed on a pair of support blocks 24, respectively. The covered fiber portions 11 are clamped by a pair of sheath clamps 26. Sheath clamp 26 is provided at one end of sheath clamp arm 128. Fiber clamp arm 23 and sheath clamp arm 128 are mounted to the frame of the apparatus. Sheath clamp arm 128 can be swung around pin 131. Fiber clamp arm 23 can also swing around a pin (not shown). Support blocks 24 can each be swung around respective points 28 clockwise and counterclockwise as shown by arrow 30 in FIG. 5.

Support block 24 at the right of stopper 39 (as viewed in FIG. 5) is urged at its lower end portion by means of a spring, so that it usually turns counterclockwise around pin 28 at the right of stopper 39.

When however dial 32 at the right of stopper 39 is manually turned, swash plate cam 34 at the right of stopper 39 is rotated and spindle 36 at the right of stopper 39 pushes the upper end portion of support block 24, at the right of stopper 39 so that such support block 24 turns around pin 28 at the right of stopper 39. Support block 24 at the left of stopper 39 (as viewed in FIG. 5) is urged at its lower end portion by means of a spring, so that it usually turns counter-clockwise around pin 28 at the left side of stopper 39. When, however, dial 32 at the left of stopper 39 is automatically turned by means of motor 72, spindle 36 at the left of stopper 39 pushes the upper end portion of support block 24 at the left of stopper 39, so that such support block 24 turns clockwise around pin 28 located at the left of stopper 39. With this mechanism, optical fibers 10 are moved forwardly or backwardly in Z axis.

Reference numeral 38 designates a pair of electrodes for generating arc discharge therebetween so that optical fibers 10 may be fusion-spliced. Reference numeral 39 designates a stopper to which the optical fibers abut.

A pair of rotating mechanisms 44A and 44B are provided for rotating the optical fibers. The upper portion 42 of bracket 40 of each of rotating mechanisms 44A and 44B is slightly and forwardly slanted. Brackets 42 hold arms 52 and 54 while these arms are slanted slightly downward.

The rotating mechanism 44A will be described.

The tubular portion 46 of the base is rotatably supported by the downwardly slanted upper portion 42. Tubular portion 46 is manually rotatable by dial 48 formed integrally with portion 46.

Figure 6:
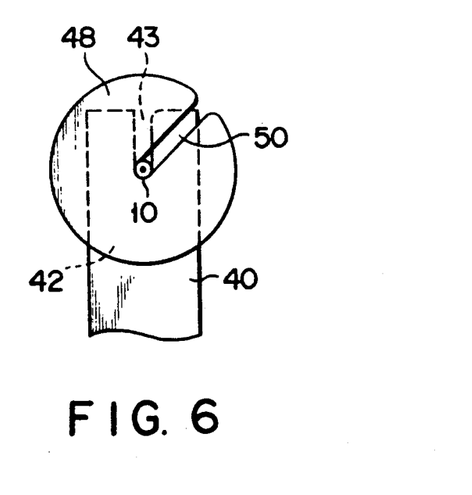
FIG. 6 shows a side view taken on line VI—VI in FIG. 5, particularly illustrating a tubular portion and a dial.

Groove 50 is formed in tubular portion 46 and dial 48, as shown in FIGS. 4 and 6. The lower end of groove 50 reaches the axes of tubular portion 46 and dial 48. Groove 43 is formed in bracket 40. Grooves 43 and 50 are aligned with each other. Then, if the optical fiber is placed in the grooves, the optical fiber is located at the center of tubular portion 46 and bracket 40. Under this condition, if tubular portion 46 and dial 48 are rotated, the optical fiber is not moved, and therefore is not twisted.

Figure 7:
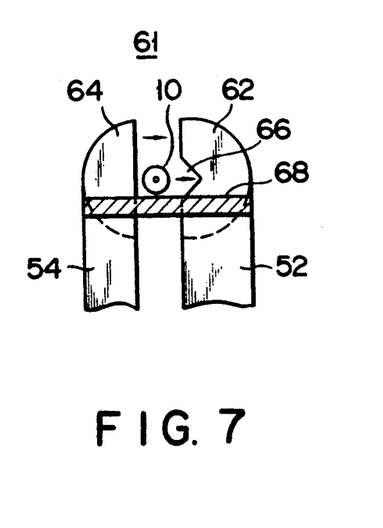
FIG. 7 shows a side view taken on line VII—VII in FIG. 5, particularly illustrating a rotatable clamp.

Fixed arm 52 and movable arm 54 project slightly downwardly from tubular portion 46. Fixed arm 52 is fixed at the tubular portion 46. Movable arm 54 is supported at the rear end by pin 56. Spring 58 and cam 60 cooperate to swing movable arm 54 at pin 56. The fixed portion 62 of clamp 61 is provided at one end of fixed arm 52, and the movable portion 64 of clamp 61 is provided at one end of movable arm 54. Fixed portion 62 and movable portion 64 are semicircular in cross section, as well illustrated in FIG. 7. When movable arm 54 is swung to be in contact with fixed arm 52, arms 52 and 54 combine to form a tubular shape. V groove 66 is formed in fixed portion 62.

Fiber guide 68 is provided before rotating clamp 61. Fiber guide 68 is fixed to only the fixed arm 52. Optical fiber 10 is placed on fixed arm 52, cam 60 is rotated to make movable portion 64 contact with fixed portion 62, and rotating clamp 61 is closed. Under this condition, optical fiber 10 is held in a clamped state. In the clamped state, if dial 48 is rotated, the clamp 61 clamping optical fiber 10 is rotated to cause optical fiber 10 to rotate around its axis.

The rotating mechanism 44B will now be described.

Rotating mechanism 44B is substantially the same as the mechanism 44A. Only that portion of this mechanism 44B which is different from mechanism 44A will be described.

In this mechanism, gear 70 is used in place of dial 48. The dial is rotated by motor 72 through a train of gears 74, 76 and 78. Gears 76 and 78 are formed integrally with each other, and are rotatable about shaft 33. An amount of rotation of motor 72 is controlled by the combination of detector 92 and control circuit 94. Detector 92 detects optical power at the light emitting end of the optical fibers (one end of the fiber at the right in FIGS. 4 and 5).

To eliminate backlash in gear 70, gear 70 is pulled by tension spring 82 through wire 80 in the direction opposite to the rotating direction of motor 72. To automatically obtain the optimum angle, it is necessary to lessen the backlash of gear 70 in the forward and reversed directions. In this instance, the backlash is substantially zero by tension spring 82, and the angle can be finely adjusted in the unit of ±0.5 degrees.

Figure 8:
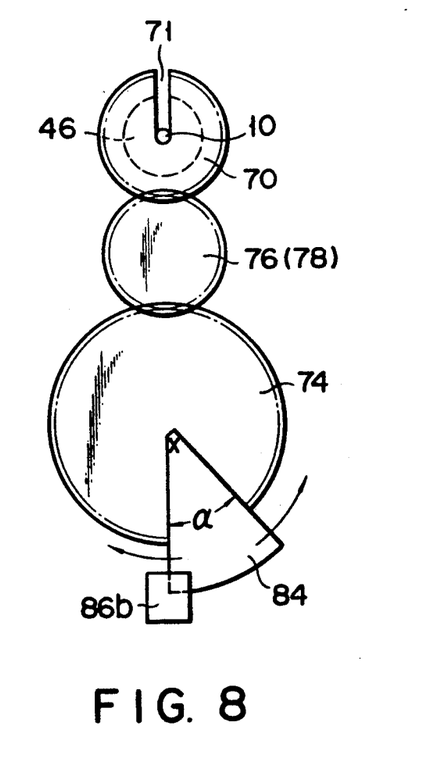
FIG. 8 shows a side view of taken on line VIII—VIII in FIG. 5, illustrating particularly a motor, a gear train, and their associated portions.

To determine the operation start point of motor 72, sensor plate 84 is mounted to gear 74, as well illustrated in FIG. 8. The sensor plate is a fan plate whose spread angle α is 45 degrees. The plate is swung clockwise or counterclockwise according to the rotating direction of gear 74. When sensor plate 84 is positioned as shown in FIG. 8, the light beam from light emitter 86a of photo sensor 86 is interrupted. If the sensor plate moves from the FIG. 8 position even slightly, the light beam is passed.

This critical point of sensor plate 84 is the start point of the motor operation. At the start point, the groove 71 of gear 70 and tubular portion 46 is opened upwardly (FIG. 8) to allow the optical fiber, if the fiber is set therein, to be picked up from the groove. If groove 71 is opened horizontally, the groove of bracket 40 is not aligned with its extension and, therefore, it is impossible to pick up the optical fiber.

Thus, in order to return motor 72 to the start point when sensor plate 84 is swung counterclockwise, sensor plate 84 is turned clockwise and is stopped by an appropriate brake means (not shown) as photo sensor device 86b is turned off.

When sensor plate 84 is swung clockwise, sensor plate 84 interrupts the light beam from photo sensor 86. In this case, therefore, sensor plate 84 is turned counterclockwise, and is stopped by an appropriate control means (not shown) as the photo sensor device 86b of photo sensor 86 is turned on.

Rotating mechanism 44B, motor 72 and the train including gears 74, 76, 78 and 70 are placed on frame 88 of a drive mechanism and movable in z-axis.

Optical fiber 10 is set on rotating mechanisms 44A and 44B and blocks 20 and 24. The fiber is held by fiber clamp 22 and sheath clamp 26, and rotating clamp 61 driven by cam 60.

Figure 9:
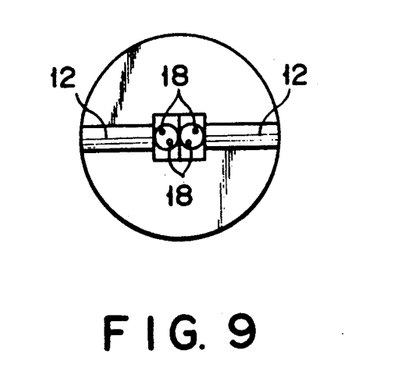
FIG. 9 shows a diagram illustrating an image of the end faces of a pair of polarization maintaining optical fibers to be fusion-spliced, when the end faces are observed by a microscope.

FIG. 9 shows an image of the end faces of the exposed fiber portions 12, which is reflected in the mirror at the end of stopper 39 and monitored through microscope 90. This monitoring of the image is not essential to this embodiment, and hence no further explanation thereof will be given.

In the alignment of the optical fibers, in a first step, an operator manually turns dial 48 in rotating mechanism 44A so that stress-applying parts 18 of one of the fibers are disposed orthogonal to those of the other fiber or displaced in maximum from those of the other fiber. This operation is done while observing the image at the end faces through the microscope. In a second step, the optical fibers are subjected to a known automatic alignment in X and Y directions. In a third step, the fibers are subjected to the automatic alignment in $\theta$ direction, i.e. the circumferential direction. This alignment is performed as follows. When, as shown in FIG. 1, stress-applying parts 18 of one of the fibers are aligned with those of the other fiber, or as shown in FIG. 2, shifted or displaced angularly in maximum, the extinction ratio of the light emitted from the light emitting end of the optical fibers is maximized. When the stress-applying parts of the fibers are shifted at 45 degrees, the extinction ratio is minimized. According to the displacement, the optical power changes. The change of optical power is detected by beam detector 92. The output of detector 92 is fed back to control circuit 94 to control the rotation of motor 72.

When the above-mentioned adjustment of the fiber alignment is completed, an electric current is fed to electrodes 38, which in turn causes an arc discharge therebetween. By the arc discharge, the optical fibers are fusion-spliced to each other.

As described above, one of the rotating mechanisms is under control of the motor. The motor is automatically controlled depending on the amount of the light emitted from the light emitting end. This realizes an exact adjustment of the optical fibers in the circumferential or angular direction. As a result, the remarkable improvements on the adjustment work can be obtained.

A second embodiment of an apparatus for fusion-splicing optical fibers according to this invention will be described with reference to FIG. 10.

Figure 10:
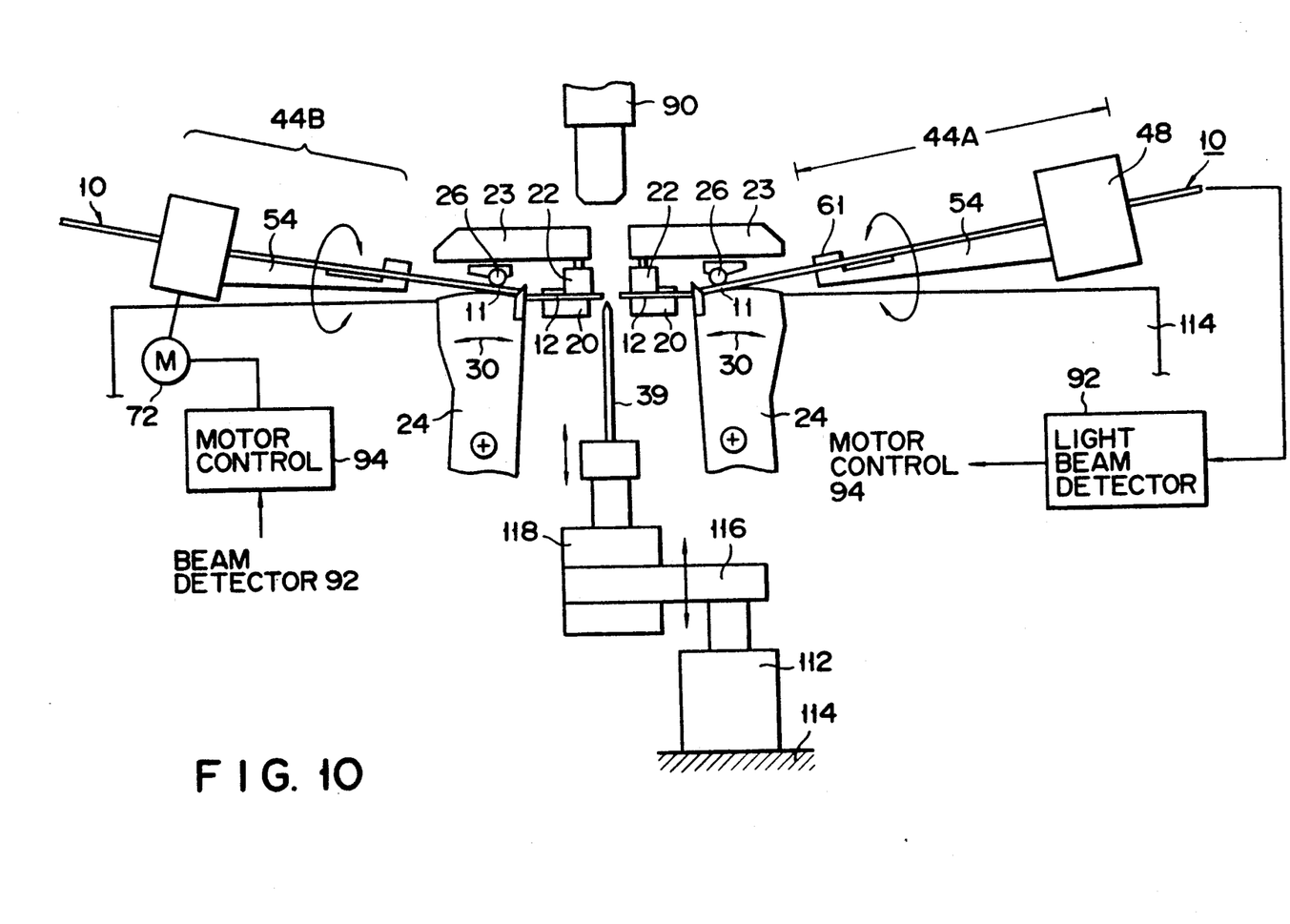
FIG. 10 shows a longitudinal sectional view of a fusion-splicing apparatus according to another embodiment of this invention.

In FIGS. 5 and 10, same reference symbols are used to designate the corresponding portions, the descriptions thereof being omitted for simplicity.

The extinction ratio is minimum when the stress-applying parts of the fibers are aligned or displaced in maximum. Therefore, it can not be determined only by the amount of the light from the light emitting end of the fibers whether the stress-applying parts are aligned or displaced in maximum.

A mirror is provided at the top of stopper 39, for observing images at both end faces of a pair of polarization maintaining optical fibers. Further provided is means for controlling the height of the top of stopper 39 at three steps, i.e., lowest, medium and highest positions.

With the second embodiment, by the combination of the mirror and the height control means, an operator can manually make coarse angular adjustment of the fiber alignment, while observing the end face images of fibers through microscope 90. Therefore, it can be ascertained whether the stress-applying parts are aligned or displaced. Moreover, the time required for the fine adjustment can be reduced when compared with the case by only the fine adjustment.

Figure 11:
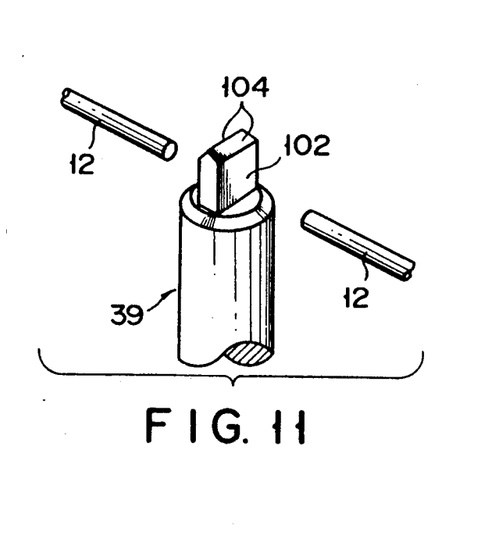
FIG. 11 shows a perspective view of the top end of a stopper used in the embodiment of FIG. 10.

As shown in FIG. 11, the upper end portion of stopper 39 has a plate member 102 with a predetermined width, whose tip is shaped like a right-angle isosceles. Each of the rectangular planes constitutes a mirror 104.

Returning to FIG. 10, first solenoid 112 is fixed to the frame 114 of the apparatus, and is used to raise yoke 116 by a predetermined height. Second solenoid 118 is fixed to yoke 116, and is to raise stopper 39 by a predetermined height.

Stopper 39 is at the lowest position when both solenoids 112 and 118 are disabled. It is at the medium position when only solenoid 118 is operated. It is at the highest position when both solenoids are operated. Alternatively, stopper 39 may be moved up and down using an appropriate drive means, for example, the motor and wire combination.

A system comprising two levers energized by two solenoids may be used to move stopper 39. When the solenoids are disabled, the levers do not move and the stopper is set at the lowest position. When the first solenoid is enable, the first lever moves and the stopper is set at the medium position. When the solenoids are enable, the levers move and the stopper is set at the highest position.

Figure 12A:
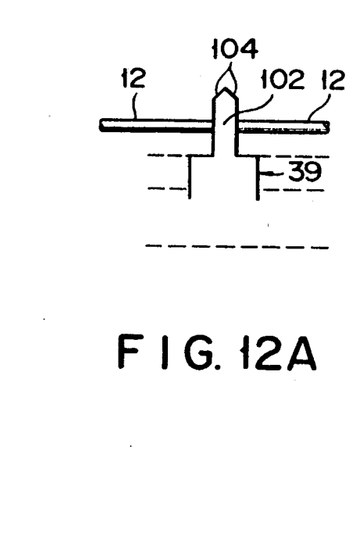
FIGS. 12A to 12C respectively show a diagram illustrating the stopper set at different positions.

The drive of stopper 39 will be described. Stopper 39 is first set at the highest position, as shown in FIG. 12A. The highest position is slightly higher than the position where the end faces of the optical fibers are made in contact with each other. Under this condition, optical fibers 10 are set in place and held by fiber clamp 22 and sheath clamp 26.

Then, optical fibers 10 are moved to be made to abut stopper 39 at the end faces of the fibers.

Figure 12B:
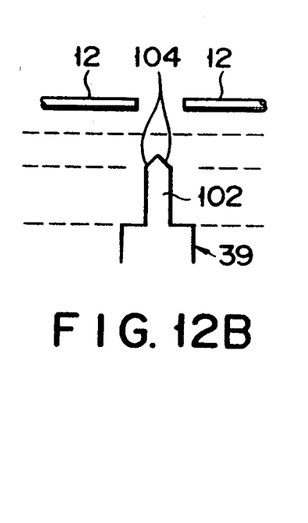

Stopper 39 is now lowered to the lowest position, as shown in FIG. 12B. This position is at least below the abutting place of optical fibers 10. A weak arc discharge is momentarily applied to the end faces of fibers 12 to heat them at high temperature. With the momentary discharge, dust attached to the end faces is burned. Moreover, the exposed portions of the stress-applying parts are sputtered due to the difference of the melting points of the cladding region and the stress-applying parts. Therefore, stress-applying parts 18 can be clearly recognized.

Figure 12C:
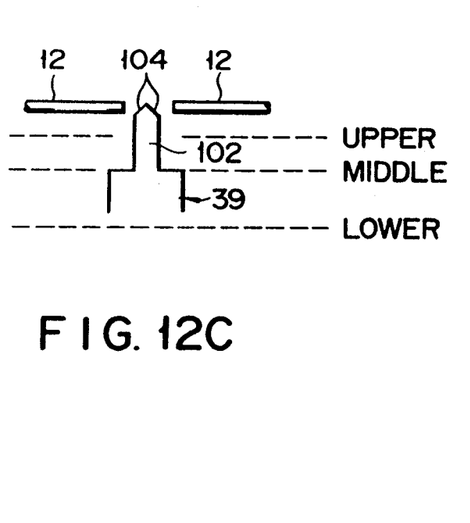
Figure 13:
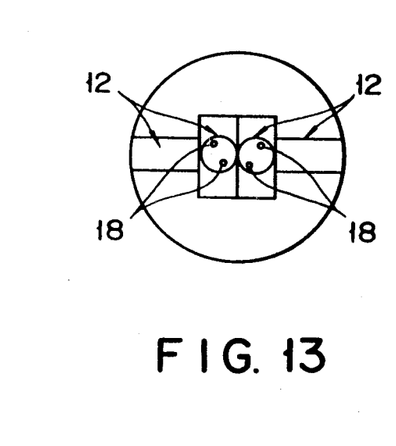
FIG. 13 shows a diagram of an image of the end faces of optical fibers when the end faces are observed by a microscope.

Stopper 39 is raised to the medium position, as shown in FIG. 12C. The medium position coincides with the abutting place of optical fibers. At this position, the mirror 104 at the top of stopper 39 reflects the image of the end faces of optical fibers 10. Mirror 104 directs the optical information of the end faces of the fibers toward microscope 90. Therefore, optical fibers 10 is clamped by rotating clamp 61. Dial 46 is manually turned to align stress-applying parts pairs 18 of the fibers as shown in FIG. 1 or rotate one of the fibers by 90° from the other, as shown in FIG. 2.

Stopper 39 is lowered to the lowest position, again. At this position, optical fibers 12 are subjected to the automatic fine adjustments in z-, x- and y-directions and the circumferential direction. Thereafter, the fibers are fusion-spliced through the arc discharge via the electrodes (not shown).

As seen from the foregoing, in this embodiment, for the coarse adjustment for the alignment of the optical fibers, the image of the end faces of the fibers is reflected by the mirror at the top of the stopper, and the image is observed through the microscope. The fine adjustment of the optical fibers is performed by the motor drive. In this way, this embodiment employs two steps for the alignment of the optical fibers, the coarse adjustment and the fine adjustment. This reduces considerably the time taken for the alignment when compared with the case using only the automatic alignment.

Sheath clamp 26 is needed for feeding the optical fibers 10. It however impedes the rotation of optical fibers 10 by rotating mechanisms 44A and 44B. This impedance hinders the fine adjustment by turning optical fibers 10.

The rotating clamp 61 is generally designed for the optical fiber whose sheathed fiber portion has a 0.9 mm outer diameter. For finer optical fibers 10 of 0.4 mm or 0.2 mm in diameter, therefore, heat shrinkable tubes or split tubes are applied to the fibers to obtain the optical fibers of 0.9 mm diameter. However, the optical fiber covered with such tube is poor in circularness, and this fact hinders the smooth turn of the fibers.

Figure 14:
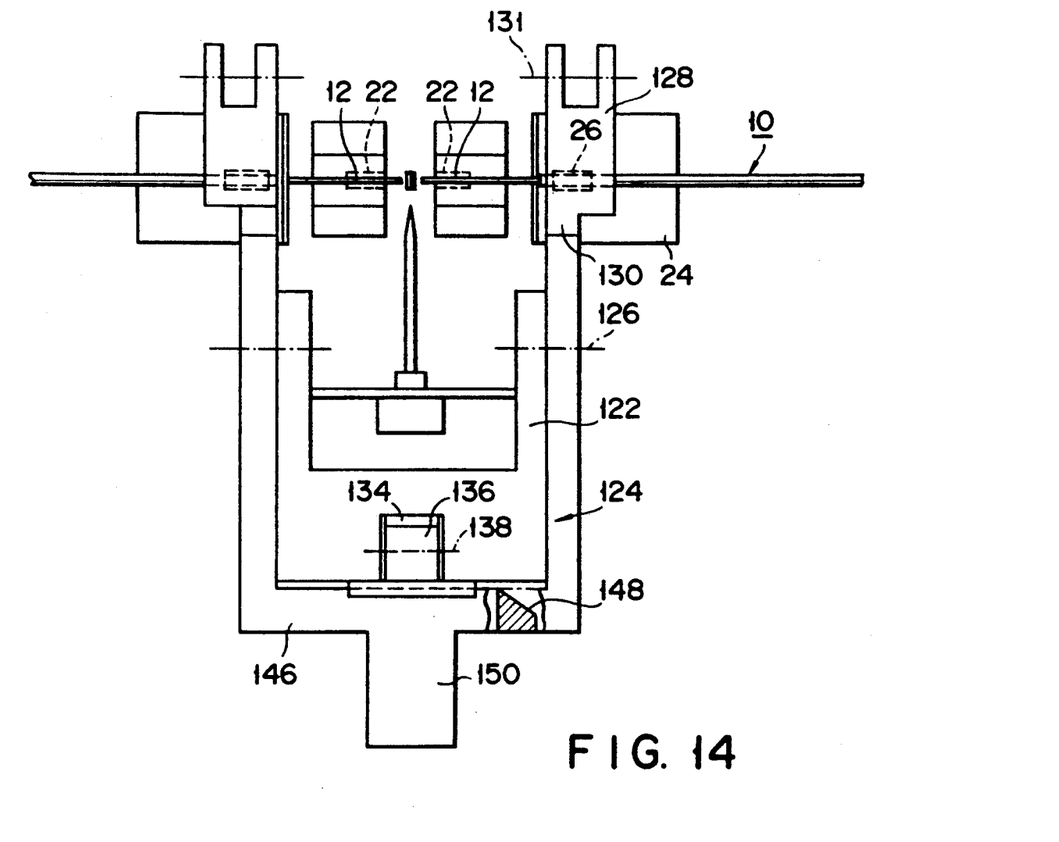
FIG. 14 shows a plan view of a fusion-splicing apparatus according to yet another embodiment of this invention.
Figure 15:
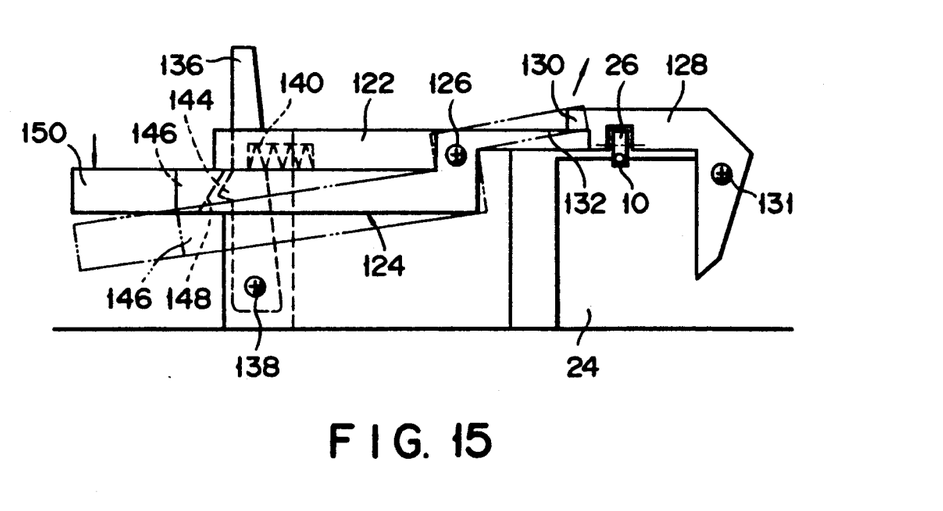
FIG. 15 shows a side view of the fusion-splicing apparatus of FIG. 14.

A third embodiment of this invention, which is designed for solving the problem, will be shown in FIGS. 14 and 15. In this embodiment, sheath clamp 26 is released from being held, while keeping the clamping of fiber clamp 22. This feature allows the adjustment for alignment of the optical fibers to be well done free from the above-mentioned problem.

In FIGS. 14 and 15, reference numeral 122 designates a part of frame 114 of the apparatus, and is substantially V-shaped as viewed from above. Lever 124 of substantially V-shape is swung about pin 126. Sheath clamp arm 128 can be swung about pin 131 in an interlocking manner as shown in FIG. 15. Fiber clamp 22 and sheath clamp 26 are held by springs (not shown). In this case, the former is slightly held, but the latter strongly held. Projection 130 is formed at the top of the arm 128 of sheath clamp 26. The sheath clamp arm is mounted to the frame of the apparatus and can be swung at pin 131. The end 132 of lever 124 is set under projection 130, as well illustrated in FIG. 15. Square cut-away portion 134 is formed at the lower end portion of frame portion 122. Lock lever 136 is inserted into the cut-away portion and mounted to the frame portion by means of pin 138. Lock lever 136 can be swung around pin 138. Spring 140 biases lock lever 136 backwardly.

Hook 144 is provided on the rear side of lock lever 136. Horizontal bar 146 of lever 124 has surface 148 slanted downwardly. When lever 124 is pulled down, the hook 144 of lock lever 136 is placed in the space defined by the slanted surface.

The operation of this embodiment is as follows.

(1) A pair of optical fibers 10 are set in place, and clamped by fiber clamp 22 and sheath clamp 26. The distance between the end faces of the optical fibers is determined by the stopper. Then, these fibers are held by the rotatable clamp (not shown), which corresponds to the clamp 61 in FIG. 4.

The rear part 150 of lever 124 is lowered. The lowered lever 124 is indicated by a phantom line in FIG. 15. Upon the lowering, sheath clamp 26 is raised through the projection 130 of end 132 of lever 124 to release clamp 26.

(2) At the same time, horizontal bar 146 engages with hook 144 to keep the lowered state of lever 124.

(3) When lock lever 136 is pushed forwardly, hook 144 disengages from horizontal bar 146 so that lever 124 is returned to the horizontal state.

Figures 16, 17:
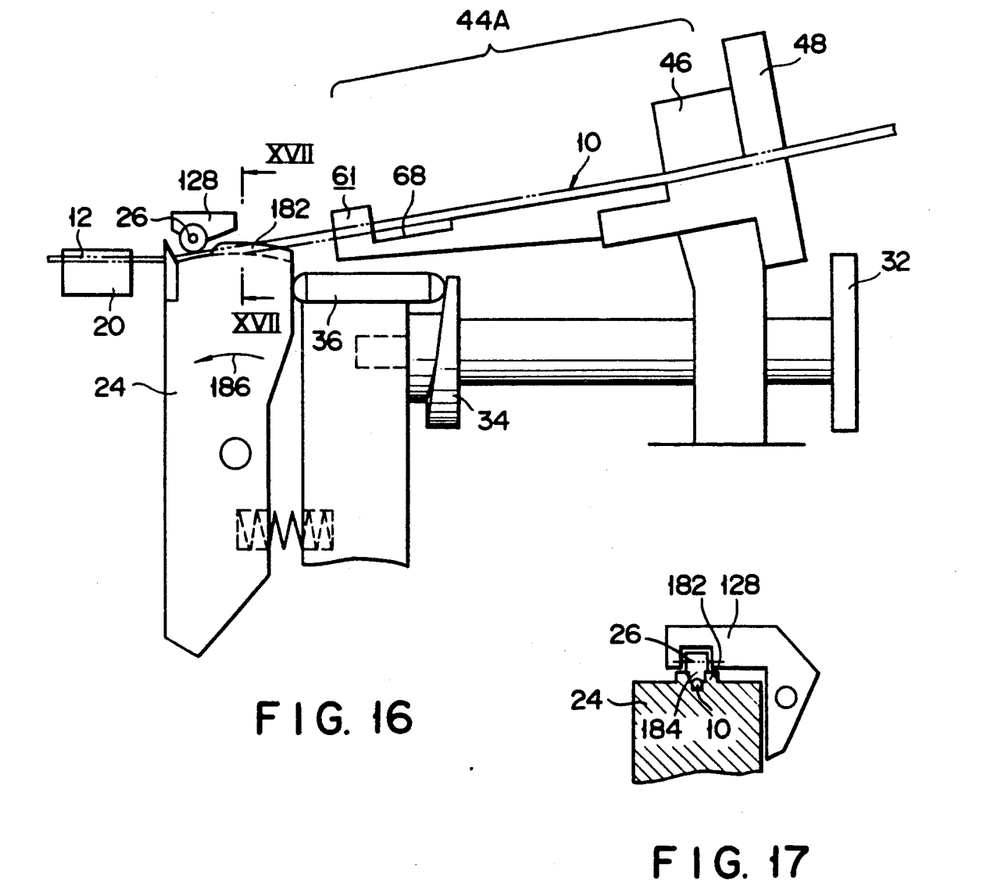
FIG. 16 shows a side view of the fusion-splicing apparatus according to a further embodiment of this invention.
FIG. 17 shows a cross sectional view of a sheath clamp and a support block taken on line XVII—XVII in FIG. 16.

A fourth embodiment of this invention is shown in FIGS. 16 and 17. As shown in FIG. 16, rib 182 is formed on almost half of the top surface of support block 24. Rib 182 provides a stepped portion. Groove 184 is formed in rib 182, as well illustrated in FIG. 17. The groove allows optical fiber 10 to smoothly be set in place. The width of groove 184 is narrower than that of sheath clamp 26.

The operation of this embodiment is as follows.

Dial 32 is turned and swash plate cam 34 is then turned. In turn, support block 24 is pushed by spindle 36 and turned in the direction of arrow 186. With this turning of block 24, sheath clamp 26 is placed on the rib 182 and clamp 26 is released from its clamping state.

In the third and fourth embodiments, the same or corresponding portions of those in FIGS. 4 and 5 are not explained and illustrated, for simplicity. For the alignment of optical fibers in the circumferential direction, it is possible to use the automatic adjustment and/or manual adjustment. The combination of the automatic and manual adjustments is preferable from a standpoint of working efficiency.

In the third and fourth embodiments, in the alignment in the circumferential direction, the sheath clamp is released from its clamping state. Therefore, the impedance for the turning of the fibers is little, realizing an exact alignment of optical fibers.

In the circumferential direction alignment, a twisting force is applied to the portions of the optical fibers, which are outside the rotatable clamp 61.

After the fusion-splice of the optical fibers is completed, the spliced fiber is removed from the apparatus, and the spliced part of the fiber is reinforced. When the spliced fiber is removed, fiber clamp 22, sheath clamp 26 and rotatable clamp 61 are all removed. At this time, twisting force is directly applied to the spliced part of the fiber.

A polarization maintaining optical fiber is sensitive to the twist. It is, therefore, preferable to apply the reinforcement to the spliced part of the optical fiber with less twist.

A fifth embodiment of this invention will be described. In this embodiment, after the fusion-splicing of the optical fibers, twist preventing unit 40 is attached to the fusion-splicing apparatus which clamps the spliced optical fiber to lock the fiber against its turn. This will be described referring to FIGS. 18 and 19.

Figure 18:
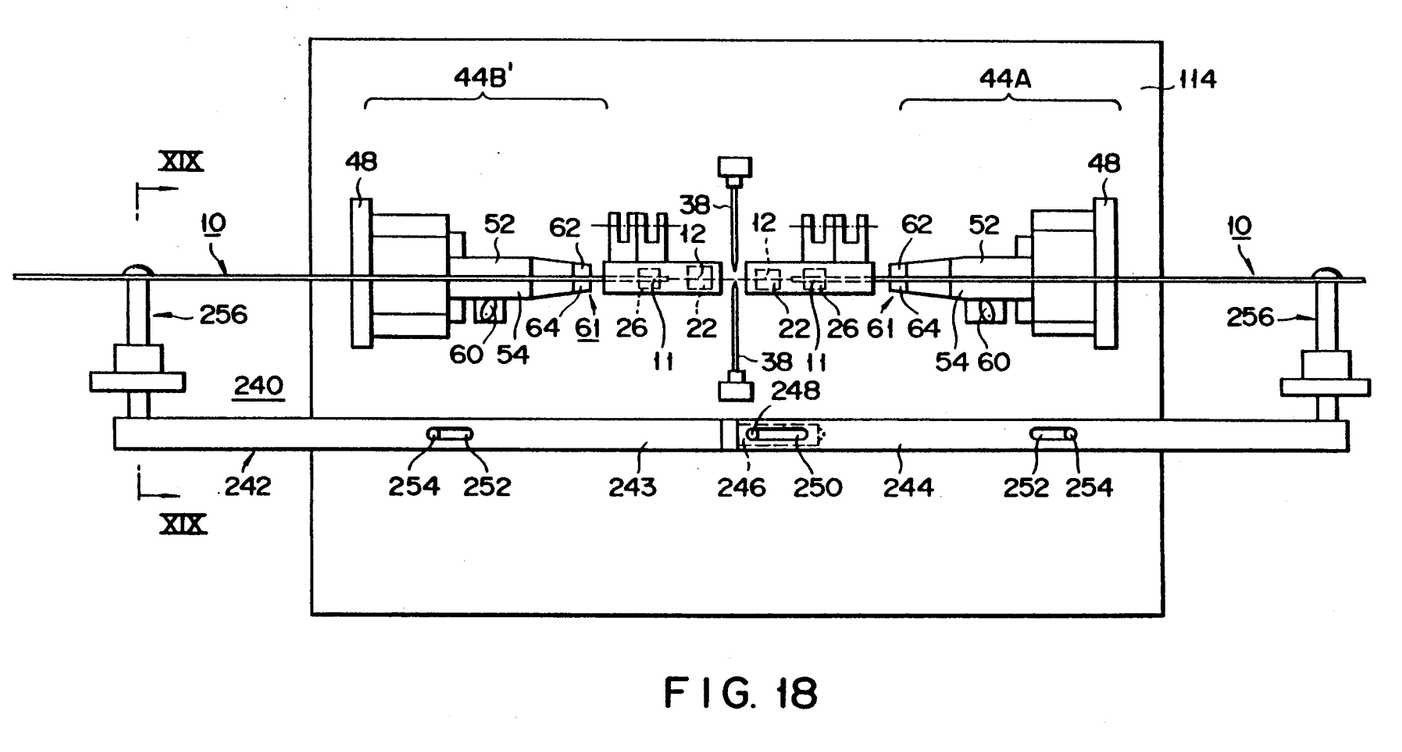
FIG. 18 shows a plan view of a fusion-splicing apparatus according to another embodiment of this invention.
Figure 19:
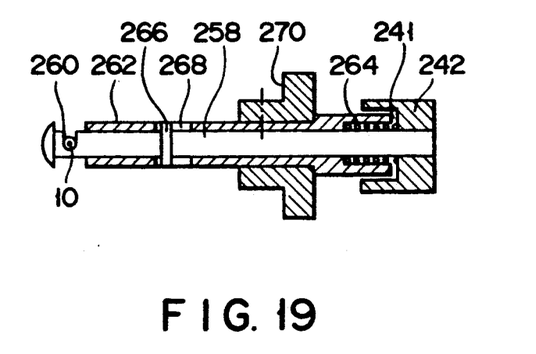
FIG. 19 shows a longitudinal sectional view of a clamp mechanism taken on line XIX—XIX in FIG. 18.

As shown in FIG. 18, twist preventing unit 240 is comprised of arm 242 and clamp means 256. Arm 242 is a bar shaped square in cross section. It can be divided into two sections, right and left halves 244 and 243. Coupling bar 246 is projected from the end face of the left half section 243. This coupling bar 246 is slidably fitted into the end portion of the right half section 244. Pin 248 of coupling bar 246 and elongated hole 250 of the right half section 244 cooperate to limit the sliding range of these sections. Clamp means 256 are planted in both ends of arm 242. Each clamp means 256 contains circular rod like shaft 258. This shaft is fixed at the base to arm 242, and has a U-shaped groove 260 at the top. Optical fiber is fit in groove 260. Sleeve 262 is slidably fitted around shaft 258. The base of sleeve 262 is slidably fitted in concave 241 of arm 242. It is always biased to the left by spring 264 as shown in FIG. 19. Pin 266 is mounted to shaft 258. Pin 266 is coupled with elongated hole 268 of sleeve 262 to prevent the sleeve from slipping off and to limit the movement of sleeve 262. Knob 270 is fixed to sleeve 262.

In use, sleeve 262 is moved toward arm 242 by a finger as shown in FIG. 19. Optical fiber 10 is inserted into groove 60, and the finger is detached from it. Then, sleeve 262 is automatically returned to its original place by spring 264. In turn, optical fiber 10 is pushed against the side wall of groove 260 for clamping. Under this condition, the fiber is locked against its turn.

A couple of circular rods 254 are upstanding on the upper surface of frame 114 of the apparatus, while spaced by a predetermined distance. The rods are inserted into elongated holes 252 of arm 242 to removably attach the twist preventing unit to the frame 114 of the apparatus.

The operation of this embodiment will be described.

The operation of the fusion-splicing apparatus until the fusion-splice is substantially the same as those of the embodiments already mentioned, and hence the description thereof will be omitted.

(1) Following the fusion-splice of the optical fibers, the twist preventing unit is attached to the fusion-splicing apparatus, by inserting upstanding rods 254 into elongated holes 252. Optical fiber 10 is clamped by means of clamp means 256. While in the embodiment of FIGS. 4 and 5, the rotating mechanism 44B is automatically driven by the motor, in this embodiment, it is manually driven by the dial. For this, it is designated as 44B'.

(2) Then, rotatable clamp 61 is released. After the screening is completed, fiber clamp 22 and sheath clamp 26 are released.

(3) Since the rotating mechanisms 44A and 44B' are slanted forwardly, optical fiber 10 is shaped like widely opened V. Therefore, if it is removed from the apparatus, it has a slack. To eliminate this slack, the right and left half sections 244 and 243 are slightly opened. Further, the twist preventing unit is removed from the frame 114 of the apparatus, while fiber 10 is being clamped. Thereafter, the spliced part of the fiber is reinforced.

According to this embodiment, prior to the reinforcement of the spliced part of the fiber, the fiber portion at the outside of the spliced part of the fiber is clamped by the twist preventing unit, and then the fiber is removed for the reinforcement. Therefore, the twist problems can be solved successfully.

As seen from the foregoing, the present invention provides an apparatus for fusion-splicing a pair of polarization maintaining optical fibers, which can remarkably improve the alignment of optical fibers.

What is claimed is:

1. An apparatus for fusion-splicing a pair of polarization maintaining optical fibers comprising:
   a body;
   a pair of supporting members provided on said body and arranged in a line for supporting thereon a pair of polarization maintaining optical fibers in a line;
   a first clamp means for clamping an end portion of one of said pair of polarization maintaining optical fibers, said first clamp means being provided on said body;
   a second clamp means for clamping an end portion of the other of said pair of polarization maintaining optical fibers, said second clamp means being provided on said body;

manual rotation means coupled to said first clamp means for rotating the first clamp means to rotate the end portion of one clamped optical fiber about an axis thereof to enable a fast coarse rotational alignment with the end portion of the other clamped optical fiber;

motor means coupled to said second clamp means for rotating the second clamp means to rotate the end portion of said other clamped optical fiber about an axis thereof to achieve a fine rotational alignment of the end portion of said other clamped optical fiber with the end portion of said one clamped optical fiber;

motor control means connected to said motor means for controlling the rotation of said motor means to minimize an extinction ratio of said pair of optical fibers;

means for moving said pair of optical fibers toward each other provided on said body;

stopper means having mirror means mounted thereon provided on said body, said stopper means being set to one position selected from among a first position, a second position, and a third position, the stopper means functioning in said first position as a stopper against said optical fibers when the optical fibers are moved toward each other by said moving means, and functioning in said second position as a mirror for reflecting an image of respective end faces of said pair of optical fibers facing each other, the stopper means when set to said third position being displaced away from the line along which said optical fibers are supported so that said optical fibers are permitted to further move toward each other by said moving means to abut against each other;

said manual rotation means and said motor means being rotated when said stopper means is set to said second position;

a microscope for observing, via said mirror means, when said stopper means is set to said second position, the image of the end faces of said pair of optical fibers to determine the rotational alignment of the optical fibers; and fusion splicing means provided on said body, located between said first and second clamp means, for fusion-splicing the end portions of said pair of optical fibers by an arc discharge after said fine rotational alignment is completed.

2. The fusion splicing apparatus according to claim 1, in which said motor control means includes light amount detecting means for detecting an amount of light emitted from an end portion of said other clamped optical fiber remote from the rotated end portion thereof, said emitted light resulting from light which has entered an end portion of said one clamped optical fiber remote from the end portion thereof, and means for automatically controlling the rotation of said motor means according to the emitted light amount detected by said light amount detecting means.

3. An apparatus for fusion-splicing a pair of polarization maintaining optical fibers according to claim 1, in which said mirror means is a mirror for directing the image of said end faces of said pair of optical fibers toward said microscope.

* * * * *